Jan. 3, 1933.  W. A. COLLINS  1,893,400
TEMPERATURE INDICATOR
Filed Feb. 27, 1926
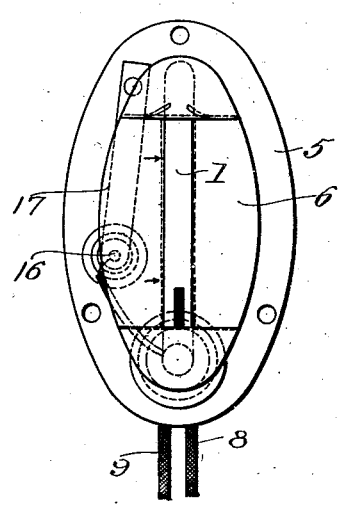
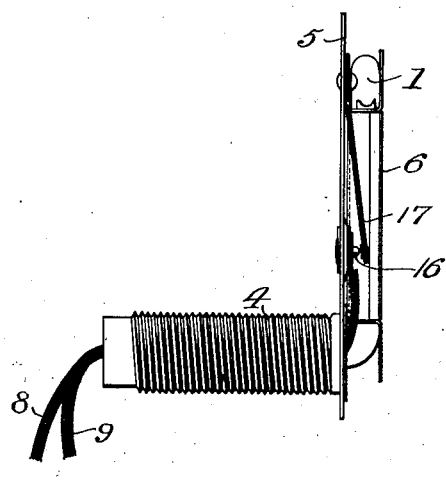
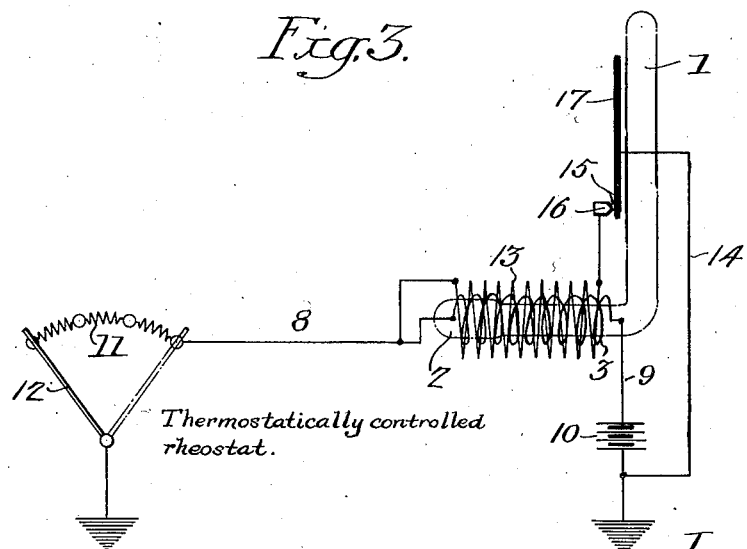
Inventor:
William A. Collins,
by his Attorneys,
Howson & Howson.

Patented Jan. 3, 1933

1,893,400

UNITED STATES PATENT OFFICE

WILLIAM A. COLLINS, OF BROOKLYN, NEW YORK, ASSIGNOR, BY MESNE ASSIGNMENTS, TO MOTO METER GAUGE & EQUIPMENT CORPORATION, OF TOLEDO, OHIO, A CORPORATION OF DELAWARE

TEMPERATURE INDICATOR

Application filed February 27, 1926. Serial No. 91,168.

This invention relates primarily to devices for affording the operator of a motor car a more or less accurate knowledge of the temperature changes in the motor, and more particularly the invention relates to that type of device in which the indicating instrument comprises a temperature responsive element operatively connected by suitable means with the motor and located upon the dash-board of the vehicle.

It has been found in instruments of this general character that low temperatures, such as are experienced during the winter months, have a marked effect upon the temperature responsive element forming a part of the indicating instrument located at the dash, causing the element to lag in its operation behind the motor temperatures and to afford a false indication of the actual engine temperature during the initial stages of operation. In other words, the engine when started cold may reach its normal operating temperature and even exceed it without a proper indication of the temperature appearing at the indicating instrument on the dash.

The principal object of this invention, therefore, is to provide means operative at low atmospheric temperature for so affecting the thermosensitive element in the indicator as to afford a more accurate indication of the motor temperatures during the initial stages of operation.

In the attached drawing, in which I have illustrated a device made in accordance with this invention:

Figure 1 is a front view of the indicator portion of the device adapted for mounting on the dash of a motor vehicle;

Fig. 2 is a side elevation of the indicator with the frame removed, and

Fig. 3 is a diagrammatic view illustrating the details of the invention.

Referring to the drawing, the indicator, as illustrated in Figs. 1 and 2 and diagrammatically shown in Fig. 3, consists of a thermosensitive element in the form in the present instance of a thermometer 1. The bulb of the thermometer, designated in Fig. 3 by the reference numeral 2, projects at right angles to the indicating part and is surrounded by an electric heating coil 3 which is shown in Fig. 3 as a true helix and which, as hereinafter described, is connected in an electrical circuit including a thermostatic rheostat operatively connected with the motor. The bulb 2 of the thermometer is housed in the present instance in an externally threaded cylindrical extension 4 of a base plate 5, and the indicating portion of the thermometer 1 carries a dial plate 6 bearing the various graduated markings relative to the temperature of the motor. The device further comprises a suitable glass-holding frame (not shown) adapted to be secured to the front of the plate 5 and to enclose or house the dial plate and the thermometer. The entire device is adapted to be installed on the dash of a motor vehicle by inserting the threaded cylindrical extension through an aperture in the dash-board so that the plate 5 rests against the dash and securing the device in this position by a nut (not shown) threaded upon the extension 4 in back of the panel.

As previously stated, the heating coil 3 is installed within the cylindrical extension 4, and from the rear of this extension extend two wires 8 and 9 which are respectively connected with the opposite ends of the coil 3. As indicated in Fig. 3, one of these wires 9 extends to a battery 10, which may be the starting battery of the motor vehicle, while the conductor 8 extends to a thermostatically-actuated rheostat 11 operatively connected with the motor vehicle so as to be responsive to the temperature changes therein. The arrangement in this rheostat is such that the thermosensitive actuating element 12 moves with increasing temperatures in the motor to successively cut out the resistance in the rheostat so that as the temperature of the engine rises, the resistance in the circuit is cut out in corresponding ratio so that an increasing amount of current passes through the heating coil 3. The arrangement is such that normally the reading in the thermometer 1 gives an accurate indication of the temperature in the motor vehicle. In the present instance, one terminal of the battery 10 and of the rheostat 11 is grounded through the frame of the motor vehicle.

As previously stated, low temperatures at the dash have the effect of causing the reading in the indicator to lag behind the actual temperatures in the engine, so that in cold weather the engine may overheat without a proper warning being given to the operator of the vehicle. In order to overcome this delayed action in the indicator, I provide a second heating coil 13 shown in zigzag in Fig. 3 and arranged in a circuit shunting the coil 3 and the battery 10. This shunt circuit designated by the reference numeral 14 in Fig. 3 also includes a thermostatic switch 15 which is mounted in the present instance upon the base plate 5 immediately adjacent the thermometer 1, as clearly illustrated in Figs. 1 and 2. This switch consists in the present instance of a contact element 16 and a thermosensitive arm 17 which at a predetermined low temperature is adapted to close the shunt circuit 14 by contacting with the element 16. In the present instance, the thermosensitive element 17 is so arranged and constructed as to remain out of contact with the element 16 so long as the temperature around it exceeds 40° F. Below this temperature, however, the arm 17 moves over to contact with the element 16, thereby to close the shunt circuit which as previously stated includes the auxiliary heating coil 13. In this manner, as will be apparent, two circuits are formed, both of which shunt the battery 10, one of these circuits including the main heating coil 3, the rheostat 11 and the ground connection through the frame, and the other circuit including the two heating coils 3 and 13.

Assuming now that the motor is started cold in an atmospheric temperature below 40° F., at this low temperature the switch 15 is closed, thereby closing the shunt circuit which includes the two coils 3 and 13. Also the other circuit which includes the coil 3 and the rheostat 11 is also operative and the resistance in the various parts of these two circuits is such that there is, under these conditions, a maximum flow of current through the coil 13. This has the effect of boosting the temperature which controls the thermometer 1 to the point where the indicated temperature in spite of the low atmospheric temperature corresponds with reasonable accuracy to the steadily increasing temperature in the motor. As the motor temperature increases, the resistance in the rheostat is gradually cut out, as previously described. As the rheostat resistance is decreased, a greater proportion of the current flows through the circuit which includes this rheostat and the coil 3, while the current through the other circuit which includes the coil 13 is correspondingly decreased until under normal operating temperatures practically no current flows through the coil 13, even though the switch 15 remains closed. The thermometer now gives a true indication of the motor temperature, and the boosting effect of the auxiliary coil 13 is no longer required.

It will be noted, therefore, that with this device I have provided means, automatically effective at low atmospheric temperature, for affording in the indicator a more nearly accurate indication of the motor temperature in the initial stages of operation, this comprising auxiliary heating means in the indicator which is automatically cut out as the requirement for increased temperature is removed.

It will be understood that the invention is in no sense limited to the particular forms of the elements herein disclosed. The device is applicable for example to indicators in which thermosensitive means other than a thermometer is employed. The invention in its broader aspects also is applicable for indicating temperatures other than in motor vehicles, and I do not wish it limited in this respect.

I claim:

1. In a temperature indicating device, the combination with a thermostatic rheostat, of a heating coil and a source of current connected in series with the rheostat, temperature responsive indicating means operatively associated with said coil, a supplemental heating coil associated with the said indicating means, a thermostatic switch in series with the supplemental coil and located adjacent the indicating means, and a circuit shunting the main heating coil and the source of current and including the supplemental coil and thermostatic switch.

2. In a temperature-indicating device, the combination with a thermostatic rheostat, of a heating coil and a source of current connected in series with the rheostat, temperature-responsive indicating means in proximity to said coil, auxiliary heating means also in proximity to said indicating means, means for rendering said auxiliary heating means operative at a predetermined low atmospheric temperature, and means including said rheostat whereby the temperature of said auxiliary heating means is progressively decreased as the temperature at the rheostat increases.

3. A temperature-indicating device comprising an electrical circuit including primary and secondary heating means and a source of electric current for energizing said heating means, temperature-responsive indicating means in proximity to both said heating means, temperature-responsive means for progressively decreasing the current in said secondary heating means as the current in said primary heating means increases, and a thermostatic switch in circuit with said secondary heating means for maintaining the same operative below a predetermined temperature.

4. In a temperature-indicating device for motor vehicles, the combination with a heating coil and means for connecting said coil in an electrical circuit, of an auxiliary heating coil, means including a thermostatic switch for connecting said auxiliary heating coil in an electric circuit and maintaining the circuit of said auxiliary coil closed below a predetermined temperature, means for progressively decreasing the temperature of said auxiliary heating coil as the temperature in the motor increases, and a thermosensitive indicating element in proximity to said coils and said thermostatic switch.

5. In a temperature-indicating device for motor vehicles, the combination with a heating coil and means for connecting said coil in an electrical circuit, of an auxiliary heating coil, means including a thermostatic switch for connecting said auxiliary heating coil in an electric circuit and maintaining the circuit of said auxiliary coil closed below a predetermined temperature, temperature-responsive means for progressively decreasing the temperature of said auxiliary heating coil as the temperature in the motor increases, and a thermosensitive indicating element in proximity to said coils and said thermostatic switch.

6. In a temperature-indicating device, an electrical circuit including a plurality of heating means and a source of current for energizing said heating means, temperature-responsive indicating means in proximity to said heating means, temperature responsive means for progressively increasing the current in one of said heating means and simultaneously progressively decreasing the current in another of said heating means, and means in circuit with one of said heating means for maintaining the same operative below a predetermined degree.

WILLIAM A. COLLINS.